United States Patent
Huang

(10) Patent No.: US 8,267,218 B2
(45) Date of Patent: Sep. 18, 2012

(54) POWER OPERATED STEERING ASSISTING DEVICE FOR VEHICLES

(76) Inventor: Yuan-Hsiang Huang, Xinshe Township, Taichung County (TW)

( * ) Notice: Subject to any disclaimer, the term of this patent is extended or adjusted under 35 U.S.C. 154(b) by 376 days.

(21) Appl. No.: 12/580,257

(22) Filed: Oct. 16, 2009

(65) Prior Publication Data

US 2011/0088962 A1   Apr. 21, 2011

(51) Int. Cl.
*B62D 5/04*   (2006.01)

(52) U.S. Cl. .......... 180/444; 180/443; 180/446

(58) Field of Classification Search ......... 180/443, 180/444, 446
See application file for complete search history.

(56) References Cited

U.S. PATENT DOCUMENTS

| | | | | |
|---|---|---|---|---|
| 4,660,669 A * | 4/1987 | Shimizu | | 180/444 |
| 4,956,590 A * | 9/1990 | Phillips | | 318/432 |
| 5,631,511 A * | 5/1997 | Schulmann et al. | | 310/83 |
| 6,729,433 B2 * | 5/2004 | Uryu et al. | | 180/444 |
| 6,798,104 B2 * | 9/2004 | Kajiura et al. | | 310/162 |
| 7,118,506 B2 * | 10/2006 | Zheng et al. | | 475/18 |
| 7,306,535 B2 * | 12/2007 | Menjak et al. | | 475/29 |
| 7,735,597 B2 * | 6/2010 | Higashi et al. | | 180/444 |
| 7,845,460 B2 * | 12/2010 | Waibel et al. | | 180/444 |
| 7,878,294 B2 * | 2/2011 | Morikawa | | 180/444 |
| 8,004,132 B2 * | 8/2011 | Fukuoka | | 310/83 |
| 2005/0279978 A1 * | 12/2005 | Huang | | 254/323 |
| 2006/0264290 A1 * | 11/2006 | Arbanas | | 475/18 |
| 2009/0320536 A1 * | 12/2009 | Taniguchi et al. | | 70/252 |
| 2010/0004823 A1 * | 1/2010 | Nakatsu | | 701/41 |
| 2010/0072725 A1 * | 3/2010 | Woellhaf et al. | | 280/124.107 |
| 2010/0106375 A1 * | 4/2010 | Ahmed et al. | | 701/42 |

* cited by examiner

*Primary Examiner* — Lesley D Morris
*Assistant Examiner* — Maurice Williams
(74) *Attorney, Agent, or Firm* — Leong C. Lei

(57) ABSTRACT

A power-operated steering assisting device is provided for a vehicle and includes a rotation detector, a motor assembly, and a reduction and driving mechanism coupled to a steering shaft of a steering wheel of the vehicle. Upon detecting the rotation of the steering shaft, the rotation detector activates the motor assembly to drive the operation of the reduction and driving mechanism, so that through the engagement between an internal-toothed output ring of the reduction and driving mechanism and a toothed section formed on an outer circumference of the steering shaft, the steering shaft is rotated and an assistance to the steering operation carried out by a driver of the vehicle is realized to provide an effort-saved operation of turning the steering wheel by the driver. No hydraulic system is included in the steering assisting device and thus maintenance of the hydraulic system can be eliminated.

1 Claim, 3 Drawing Sheets

POWER OPERATED STEERING ASSISTING DEVICE FOR VEHICLES

TECHNICAL FIELD OF THE INVENTION

The present invention generally relates to a power-operated steering assisting device for vehicles, and more particularly to a device that uses a motor assembly to provide torque for assisting steering of a vehicle to which the device is attached so as to realize effort-saving and efficient control and steering of vehicles.

DESCRIPTION OF THE PRIOR ART

With the fast development of economics in every country around the world, living standard and annual income of people are increased year by year, which leads to an increasing demand of automobiles or other vehicles. Due to the significant impact of oil crisis to the transportation industry, besides the issues of quality, safety, and comfort, the automobile manufacturers are getting more concerned about energy efficiency of the automobiles and improvement of pollution emission. In view of environmental protection around the whole world, the issues are getting more and more important. The steering system of automobiles or vehicles is also related to the issue of energy saving.

Currently, transportation vehicles that are powered by gasoline or diesel are often built with a hydraulic steering system, which relies on the operation of a hydraulic pump driven by the automobile engine, often at the expense of consuming 4-6% of the engine power. Due to the repeated and cyclic circulation of the hydraulic fluid in the hydraulic piping system, the flowing of the fluid and the back pressure of the system will cause reduction of pressure of the fluid and further, the efficiency of the hydraulic operation is changed with the increase/decrease of the engine revolution. Even no steering operation is carried out, significant wear may occur in an internal crank shaft of the hydraulic system. Further, the hydraulic system includes a hydraulic cylinder that uses the hydraulic fluid as a medium for transmission of power and thus due to frequent pressurization in the operation of the hydraulic system, leaking of the hydraulic fluid becomes an inevitable problem, which may lead to contamination of the vehicle and the surroundings, and also cause deterioration of power transmission.

SUMMARY OF THE INVENTION

In view of these problems, this is actually an issue to be addressed in the automobile industry and a solution to such problems will be challenge to the innovation and revolution of the industry.

Thus, the present invention aims to provide a power-assisted steering device for vehicles that overcomes the problems mentioned above and meet practical needs of the automobile industry.

The primary objective of the present invention is to provide a power-operated steering assisting device for vehicles. The power-operated steering assisting device comprises a rotation detector, a motor assembly, and a reduction and driving mechanism that are coupled to a steering shaft of a vehicle. The motor assembly provides a torque to assist steering of the vehicle to which the device is mounted, so as to realize easy, effort-saved, and efficient operation of steering of the vehicle. No maintenance and replacement of hydraulic fluid of hydraulic systems is need for no hydraulic system is included.

The secondary objective of the present invention is to provide a power-operated steering assisting device for vehicles, comprising a motor assembly and a reduction and driving mechanism that provide a power from the motor assembly and the reduction and driving mechanism to a steering shaft of the vehicle so as to assist a driver of a vehicle to carry out steering operations and thus allowing the driver to easily turn the moving direction of a vehicle in an effort saved manner, whereby the practicability of the present invention is enhanced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
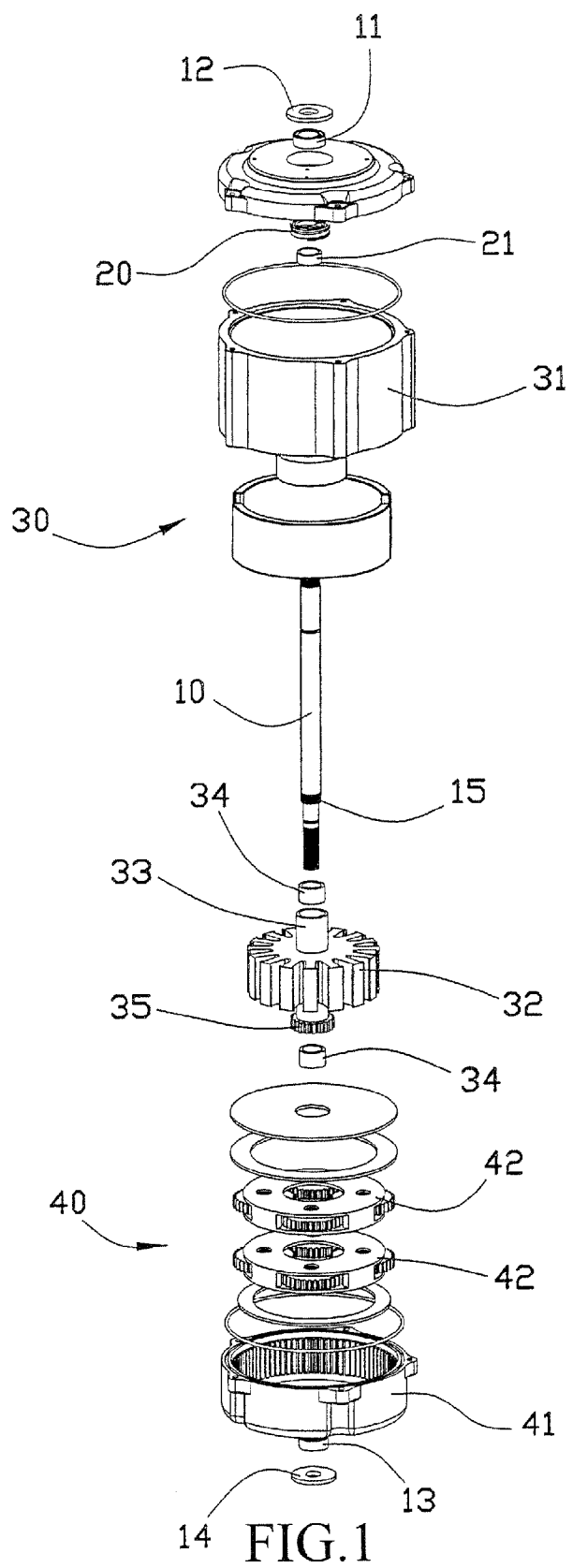
FIG. 1 is an exploded view of a power-operated steering assisting device according to the present invention.
Figure 2:
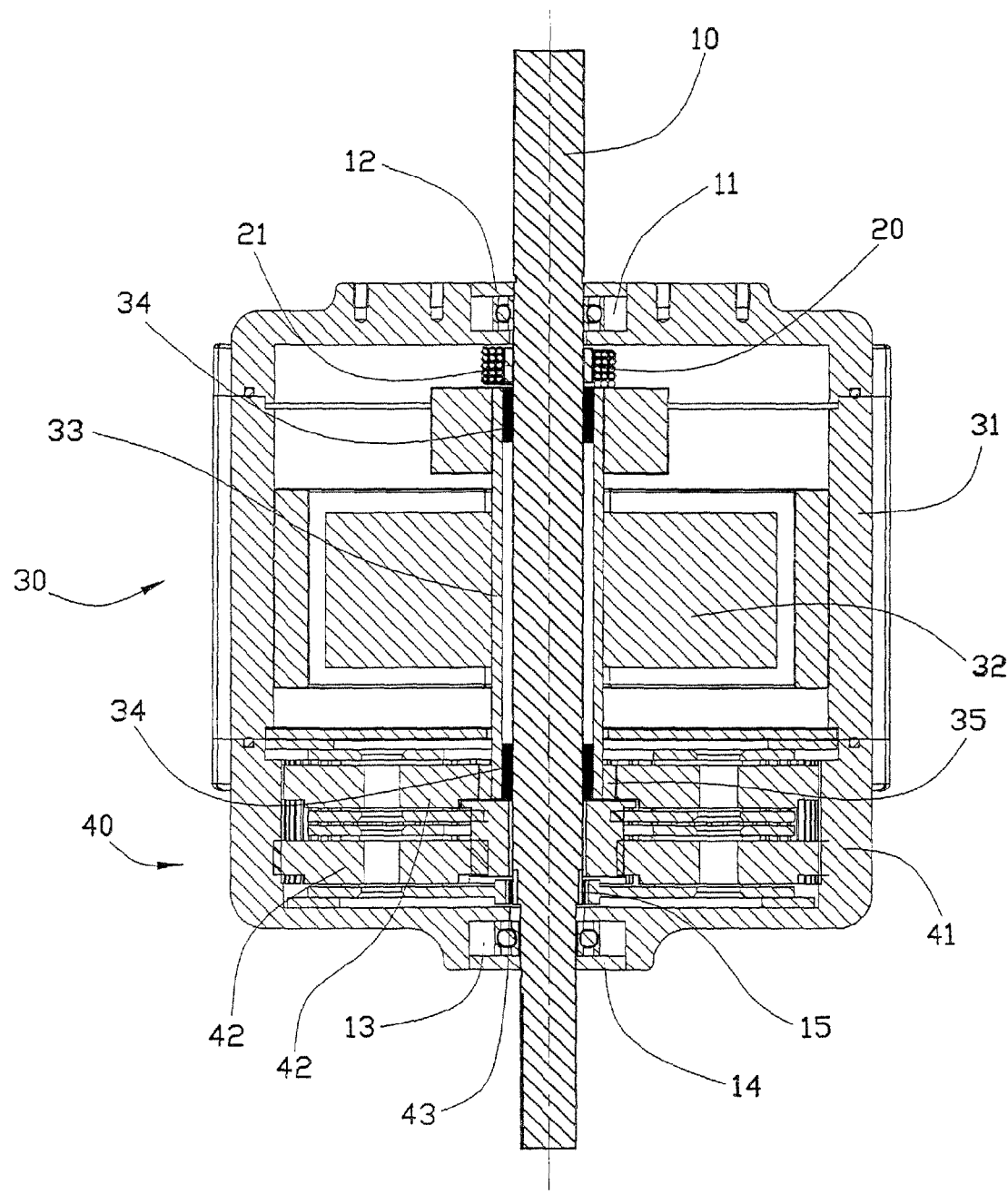
FIG. 2 is a cross-sectional view of the power-operated steering assisting device of the present invention in an assembled form.

Referring to FIGS. 1 and 2, the present invention provides a power-operated steering assisting device for vehicles. The steering assisting device of the present invention is composed of a rotation detector 20, a motor assembly 30, and a reduction and driving mechanism 40 that are coupled midway to a steering shaft 10 of a steering wheel, so as to realize assistance of steering by the motor assembly 30.

The steering shaft 10 has an outer circumference to which a bearing 11 and a ring cover 12 are fit to coaxially mount the motor assembly 30. Another bearing 13 and another ring cover 14 are also fit to the outer circumference of the steering shaft 10 to coaxially mount the reduction and driving mechanism 40. The outer circumference of the steering shaft 10 forms a toothed section 15 at a portion thereof close to the reduction and driving mechanism 40. Driving and transmission of power are realized through inter-engagement between the toothed section 15 and an internal-toothed speed-reduction output ring 43 of the reduction and driving mechanism 40.

The rotation detector 20 is mounted around the outer circumference of the steering shaft 10 at a proper location by an insulation sleeve 21 and has a function to detect the rotation of the steering shaft 10 of the vehicle steering wheel and also to provide control of activating and deactivating the motor assembly 30.

The motor assembly 30 has an enclosure 31 that is coaxially mounted around the outer circumference of the steering shaft 10 by the bearing 11 and the ring cover 12. The motor assembly 30 has a rotor 32 that comprises a hollow tube 33 centrally extending through the rotor 32 and has two opposite ends that project beyond the rotor 32 and are rotatably fit around the outer circumference of the steering shaft 10 through needle bearings 34 so that the rotor 32 and the steering shaft 10 are allowed to rotate independently. One of the ends of the hollow tube 33 is provided with a gear 35 fixed thereto to realize driving engagement with a planetary gear module 42 of the reduction and driving mechanism 40.

The reduction and driving mechanism 40 has an enclosure 41 that is coaxially mounted around the outer circumference of the steering shaft 10 by the bearing 13 and the ring cover 14 and is located adjacent to and behind the motor assembly 30. The enclosure 41, serving as a ring gear, defines an internal chamber in which a plurality of planetary gear modules 42 is arranged in a cascade manner. The leading planetary gear module 42 is set in driving engagement with the gear 35 of the hollow tube 33 of the rotor 32, while the tailing planetary gear module 42 is set in driving engagement with the toothed section 15 of the steering shaft 10 through the internal-toothed reduction ring 43.

Since the motor assembly 30 and the planetary gear modules 42 of the reduction and driving mechanism 40 are known and do not constitute novel parts of the present invention, structure details of these components will not be given herein.

To this end, the structures, space relationships, and locations of the constituent components of the power-operated steering assisting device of the present invention have been described with reference to an embodiment of the present invention.

Next, the operation of the power-operated steering assisting device of the present invention will be described in order to provide a better understanding of the present invention.

Figure 3:
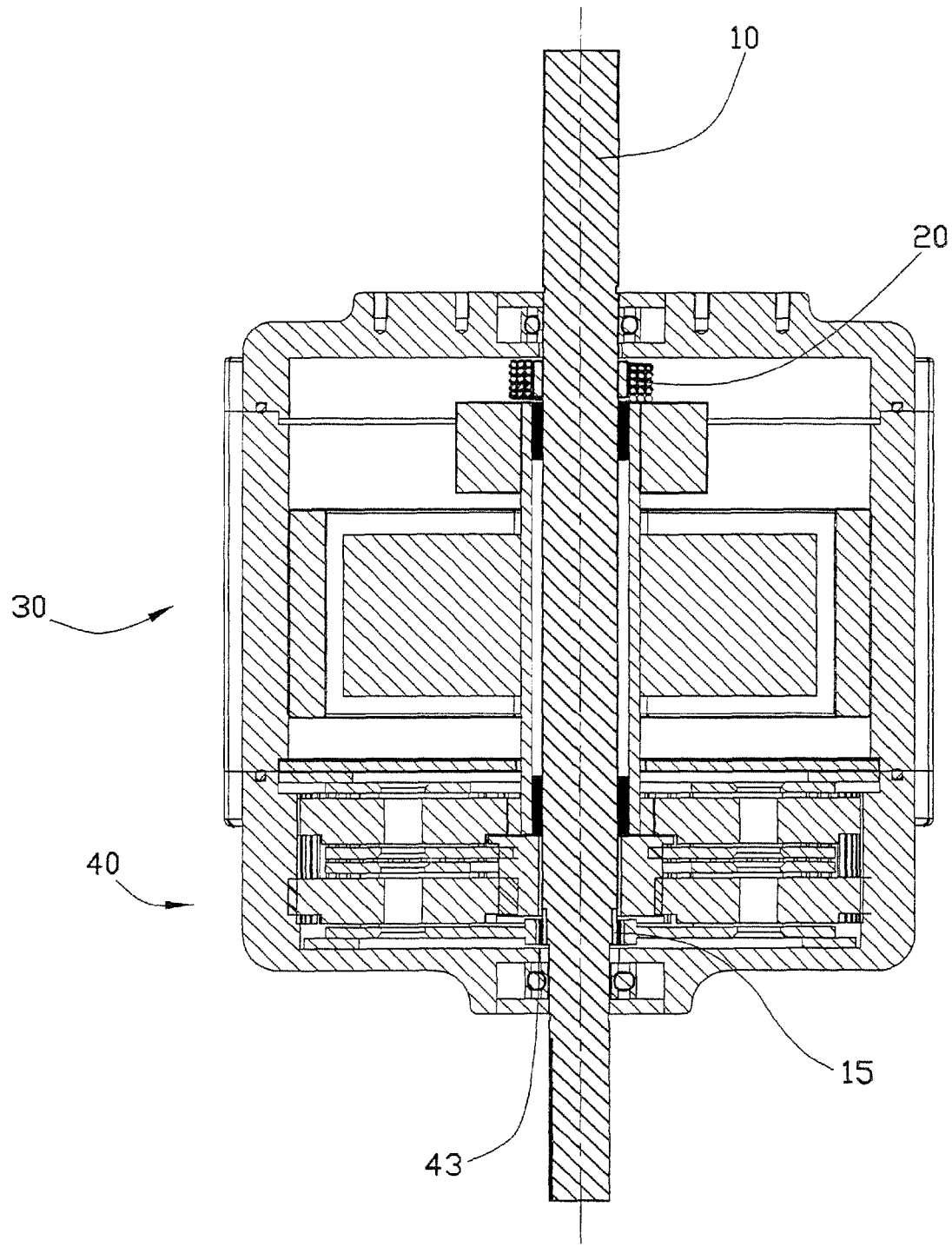
FIG. 3 is a cross-sectional view illustrating power-operated steering operation of the present invention.

Referring to FIG. 3, the rotation detector 20, upon detecting rotation of the steering shaft 10 that constitutes partly the steering wheel of a vehicle, activates the motor assembly 30 to drive the operation of the reduction and driving mechanism 40, so that through the engagement between the internal-toothed output ring 43 and the toothed section 15 of the steering shaft 10, the steering shaft 10 is rotated and an assistance to the steering operation carried out by a driver of the vehicle is realized to provide an effort-saved operation of turning the steering wheel by the driver.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A power-operated steering assisting device comprising a rotation detector, a motor assembly, and a reduction and driving mechanism that are adapted to couple midway to a steering shaft of a steering wheel of a vehicle to realize assistance of steering by power provided by the motor assembly, wherein
   the steering shaft has an outer circumference to which bearings and ring covers are fit to coaxially mount the motor assembly and the reduction and driving mechanism, and the outer circumference of the steering shaft forming a toothed section at a portion thereof close to the reduction and driving mechanism, whereby driving is realized through engagement between the toothed section and an internal-toothed output ring of the reduction and driving mechanism;
   the rotation detector is mounted around the steering shaft at a predetermined location by an insulation sleeve and has a function to detect rotation of the steering shaft of the vehicle steering wheel and also to provide control of activating and deactivating the motor assembly;
   the motor assembly has an enclosure that is coaxially mounted around the outer circumference of the steering shaft by the bearings and the ring covers, and the motor assembly has a rotor that comprises a hollow tube centrally extending through the rotor and rotatably fit around the outer circumference of the steering shaft through needle bearings so as to allow for independent rotation of the rotor and the steering shaft, an end of the hollow tube being mounted to a gear, which is set in driving engagement with planetary gear modules of the reduction and driving mechanism; and
   the reduction and driving mechanism has an enclosure that is coaxially mounted around the outer circumference of the steering shaft by the bearings and the ring covers and is located adjacent to and behind the motor assembly and the enclosure defines an internal chamber in which the planetary gear modules are arranged in a cascade manner, of which a leading planetary gear module is set in driving engagement with the gear of the hollow tube of the rotator and a tailing planetary gear module is set in driving engagement with the toothed section of the steering shaft through the internal-toothed output ring;
   wherein upon detecting rotation of the steering shaft of the vehicle steering wheel, the rotation detector activates the motor assembly to operate the reduction and driving mechanism, so that through the engagement between the internal-toothed output ring and the toothed section of the steering shaft, the steering shaft is rotated and an assistance to steering operation is realized to provide an effort-saved operation of turning the steering wheel.

* * * * *